United States Patent [19]

Robins

[11] 4,190,677
[45] Feb. 26, 1980

[54] METHOD FOR PRODUCING WOOD SMOKE ON A CHARCOAL GRILLE

[76] Inventor: John S. Robins, 1250 S. Monaco, Denver, Colo. 80222

[21] Appl. No.: 611,142

[22] Filed: Sep. 8, 1975

[51] Int. Cl.² .............................. A23L 1/01; A23B 4/04
[52] U.S. Cl. .......................................... 426/315; 99/482
[58] Field of Search ............... 426/315, 314, 523, 652; 126/25 A, 25 B, 25 C, 25 R, 25 AA; 99/339, 446, 421 P, 443, 482

[56] References Cited

U.S. PATENT DOCUMENTS

| | | | |
|---|---|---|---|
| 2,205,914 | 6/1940 | Stafford | 99/421 P X |
| 2,956,497 | 10/1960 | Bernstein | 99/446 X |
| 3,002,444 | 10/1961 | Hoebing | 99/443 R X |
| 3,125,015 | 3/1964 | Schlaegel | 99/421 P |
| 3,492,134 | 1/1970 | Brummendorf | 426/652 X |
| 3,615,729 | 10/1971 | Baker et al. | 426/314 |

*Primary Examiner*—Kenneth M. Schor
*Attorney, Agent, or Firm*—Frank C. Lowe

[57] ABSTRACT

To produce food-flavoring smoke and vapor in a gas or charcoal burner, a bed of wood flour is placed underneath the gridiron of the burner at a location which is out of the flames of the gas or burning charcoal. For example, a bed of wood flour may be placed upon a tray suspended from the gridiron. When placed at a location and in a manner to protect the wood flour and ignited, the wood flour will smolder, like burning punk, to emit smoke and vapor which is absorbed by food being cooked upon the gridiron.

1 Claim, 7 Drawing Figures

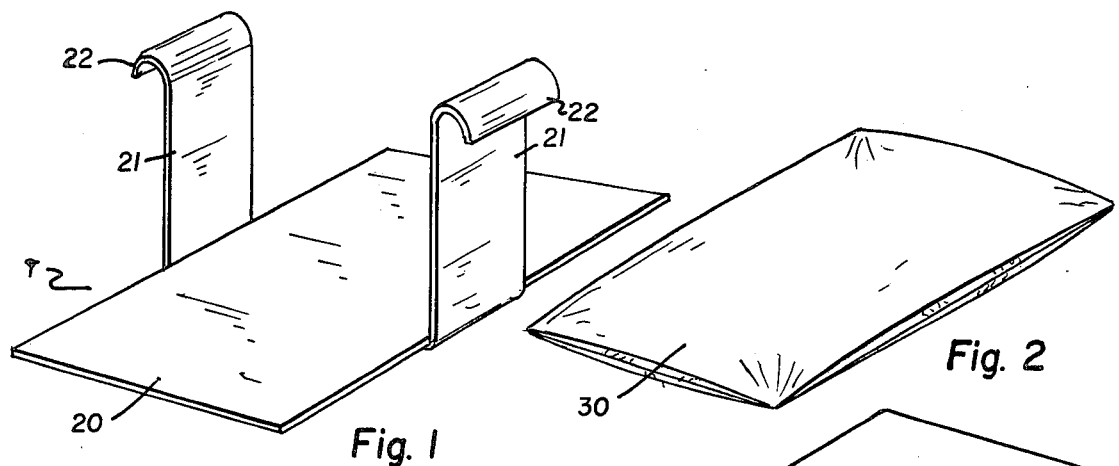
Fig. 1
Fig. 2
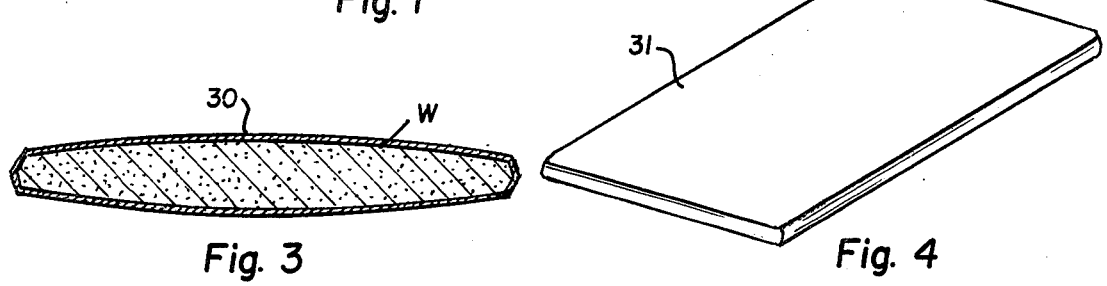
Fig. 3
Fig. 4
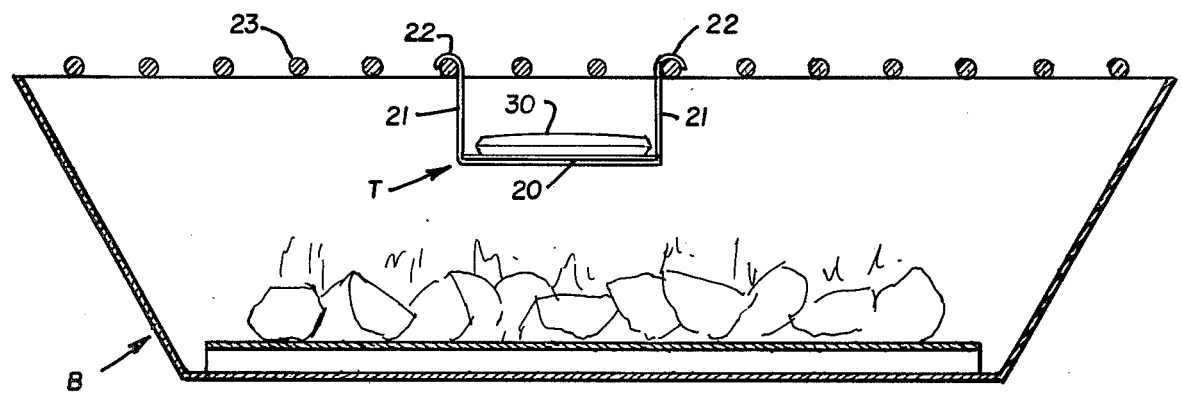
Fig. 5
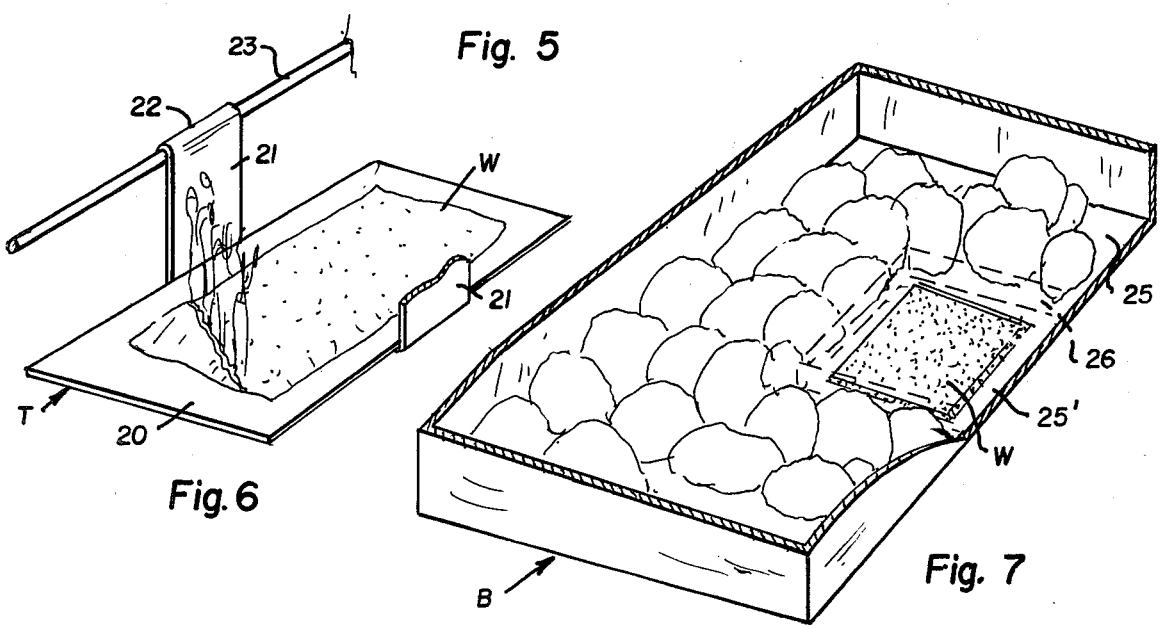
Fig. 6
Fig. 7

METHOD FOR PRODUCING WOOD SMOKE ON A CHARCOAL GRILLE

The present invention relates to cooking meat by barbecuing and to supplementing modern charcoal and gas burners to obtain this result.

Barbecuing originated in Spain and the Spaniards brought the art to the new world. Barbecuing then evolved in and became a part of the deep south. To barbecue, a pit is dug, filled with native hard wood logs, especially hickory, and a gridiron is placed over the pit after the logs are ignited. Meat placed upon the gridiron is slowly cooked over the fire with smoke from the logs imparting a flavor which has made barbecuing famous.

Today, time does not permit cooking in this manner. However, the term has been misused in connection with cooking on charcoal, gas and other types of burners. The present invention is an endeavor to provide a cooking supplement to recapture, insofar as possible, the results attained by the old fashioned barbecue when the modern types of burners are used.

The present invention thus concerns the use of smoke and vapor from burning wood in connection with barbecuing or otherwise cooking meat over an open fire, as upon a gridiron. The cooking of food over an open flame to barbecue or broil meat is, indeed, an old art, one of the oldest types of cooking in existence, though some would say a lost art since the advent of the modern gas and electric stoves. Nevertheless, in the past few decades, backyard cooking with charcoal and gas broilers has become a popular activity in the United States with a large segment of the population cooking in this manner on weekends, holidays and special occasions. The mode of outdoor cooking has become standardized. A pan-shaped burner, the charcoal or gas broiler, is topped by a gridiron where meat is placed for cooking by burning briquettes of charcoal or gas under the gridiron. The flame is clean and hot. The present invention is directed primarily to cooking with a broiler of this type and to cooking meat therein. The invention will be hereinafter described with reference to cooking meat in a charcoal broiler, although it is to be understood that the invention may be applied to gas broilers and to other types of broilers and stoves; also, for both outdoor and indoor cooking and to other foods than meat.

One disadvantage of charcoal or gas broiling, as practiced in this country, resides in the fact that it is a common practice to overcook the outer surface of the meat, permitting the intense heat of the burning charcoal to sear and even char the outer surface of the meat. Many people consider barbecuing to be necessary to improve the flavor of the meat, whereas in the annals of cooking, it has heretofore been considered by some people as being undesirable to overcook meat. Actually, what the misinformed general public are endeavoring to accomplish is to reproduce the results obtained when meat was barbecued over an open fire and a half a day, or longer, was required to do it. Various selected hard woods, such as hickory, were burned to barbecue the meat. The meat was enveloped in smoke and vapor while it was being cooked. It was the flavor imparted to the meat by this smoke and vapor that made barbecued food famous.

This desirable result has not been completely forgotten and a number of attempts have been made to produce similar conditions in modern broilers with the broilers emanating smoke and vapor from selected woods so that each outdoor cook can impart a special flavor to his food. Usually, chips or sticks of the selected woods are placed upon the charcoal embers. Also, sawdust has been sprinkled upon the fire, and even other similar expedients have been tried, all with indifferent success. The problem resides in the fact that the charcoal briquettes or gas flames are so hot that the wood chips, sticks or sawdust are promptly consumed when placed in the broiler and the smoke which is generated is ignited with little, if any, being transported to the meat.

The present invention was conceived and developed with the foregoing and other considerations in view and comprises, in essence, a method of producing wood smoke and vapors in a modern broiler wherein finely ground wood flour is added to the fire but in a manner which does not place it in contact with the coals or flames of the charcoal or gas and thus, the hot coals and flames will not quickly consume the wood flour nor ignite the smoke therefrom. This separation of the wood flour from the flames may be accomplished by carrying the wood flour upon a tray placed within the charcoal broiler at selected locations above the burning coals where the wood flour may burn independently of the burning charcoal in a subdued, smoldering manner much as a cigarette or as a stick of punk will burn. Another way to separate the wood from the burning charcoal is to place the wood flour upon the floor of the burner at a spot where the charcoal is removed, and with a screen about this spot if it is necessary to protect the wood flour from the heat of the charcoal.

Accordingly, an object of the present invention is to provide a novel and improved method whereby the smoke and vapors liberated from a selected type of wood flour can envelope meat being cooked on a modern broiler to slowly permeate into the meat and improve its flavor while it is being cooked.

Another object of the present invention is to provide a novel and improved method for producing smoke and vapor from burning wood in a modern broiler which will persist for a substantial period of time to fully permeate into the meat being cooked therein.

Another object of the present invention is to provide a novel and improved method for burning wood in the form of finely ground wood flour in a barbecue grille in a manner which provides for effective food-flavoring results with the use of a minimum amount of the wood flour.

Another object of the invention is to provide in conjunction with a modern broiler, a simple, effective apparatus holding finely ground wood flour for the purpose of flavoring meat being cooked upon the broiler.

Another object of the invention is to provide a method for burning selected blends of wood flour in a modern broiler to effectively smoke and flavor meat while it is being cooked upon the broiler in a manner which permits an amateur cook to use various types of wood and herbs to enhance the flavor of the meat he is cooking in a unique, personalized manner.

With the foregoing and other objects in view, my invention comprises certain combinations, constructions, and arrangements of parts and elements and steps, sequences and operations as hereinafter described and defined in the appended claims and illustrated in the preferred embodiment in the accompanying drawings in which:

FIG. 1 is a perspective view of a tray for holding wood flour in a charcoal broiler to permit the flour to burn in the broiler.

FIG. 2 is a perspective view of a packet containing wood flour, a preferred mode of handling the material according to the present invention.

FIG. 3 is a transverse section of a packet shown at FIG. 2, but on an enlarged scale.

FIG. 4 is a perspective view of a wafer of wood flour which may be used in lieu of the packet shown in FIG. 2.

FIG. 5 is a transverse sectional view of a charcoal broiler with the tray and packet mounted therein according to the invention.

FIG. 6 is a fragmentary perspective view of portions of the grille shown in FIG. 4, with the tray mounted therein, with the view looking down upon the tray and indicating the manner in which the wood flour burns upon the tray.

FIG. 7 is a fragmentary prospective view to show the floor of a charcoal burner and illustrating a portion of the floor being used for burning a packet of wood flour.

The preferred material for use in the present invention is a finely milled wood flour such as may be produced with a conventional milling apparatus. A suitable wood flour is of hickory wood, but other woods may also be used which are known to be good for the purpose. The invention is thus not especially concerned with the precise type of wood, but with providing the wood as a finely ground flour. It has been found that coarser wood particles such as chips and sawdust are not satisfactory because such will burn too fast in a modern broiler. It was observed that the best results were produced when the wood flour burned slowly and smoldered in the manner of burning punk. Then, a maximum amount of smoke and vapor will be released. An essential condition, as heretofore mentioned, is that this wood flour be separated and/or shielded from the flames of the burning charcoal or gas even though it is closely adjacent to these flames. Thus, the burning of the wood flour is independent of the burning of the charcoal or gas flames. A bed of wood flour will burn in this manner.

The smoke and vapor from the wood flour is from volatile essences in the wood and also, from the products of destructive distillation of the wood. Some of the more desirable essences and components of this smoke are combustible. Thus, one problem concerned with cooking meat with wood smoke to enhance the flavor is to make sure that these combustible components are not lost by ignition. A reducing atmosphere, deficient in oxygen, is thus preferable. Such is ordinarily attained above the hot charcoal briquettes in a broiler. Yet when sticks and twigs of selected woods or even sawdust are applied in this region, the wood burns too fast because of the intense heat of the charcoal flames.

The present invention solves this ignition problem, and other problems, by placing a bed of wood flour upon a supporting surface within the broiler which is adjacent to but not upon the hot charcoal. This surface may be a cleared portion of the floor of the burner or it may be a protective tray which may be suspended below the gridiron of a broiler, especially when a gas fire is used. This wood flour may be provided from a container, in packets or as cakes as hereinafter further described. When in place, the wood flour is ignited to smolder and burn like punk and the smoke and vapor will reach the meat being cooked on the gridiron before this smoke and vapor can be ignited or consumed by hot gases from the burning charcoal. By this innovation, the wood flour burns independently of the burning of the charcoal or gas flame therebelow, and this is best demonstrated by the need for igniting the bed of wood flour after it is in place. Although the tray is heated by the burning flame below it, the wood flour will usually not ignite from this heat. In essence, an essential, though simple, step of the process is to place the wood flour in an environment which is not intimately associated with the cooking fire, although such an environment may be surrounded by the cooking fire.

When a tray is used, its location within a broiler underneath the gridiron may be varied, and a selected location can be found after a few experiments. It may be placed at the center of the broiler directly underneath the meat being cooked or it may be placed at one side of the broiler where the heat of the flames is less intense. When at a side location, which may be to one side of the meat being cooked, the gridiron and the meat upon it can be covered with a sheet of aluminum foil or a pan lid to better direct the smoke and vapor from the tray and to the food.

When the wood flour is placed upon the floor of the charcoal broiler, a space is cleared away for a suitable bed, either at a side or at the center of the broiler. If necessary, a baffle, or wall, may be used to separate the wood flour from the burning charcoal. A bed of wood flour is placed upon the tray or the floor of the broiler in any suitable manner, such as by simply pouring it upon the tray, by providing packets or by providing cakes made from wood flour. Preferably, the wood flour is provided in packets, paper envelopes carrying a selected amount of wood flour. When placed upon the tray and ignited, the paper forming the packets will burn to an ash before the wood flour is ignited and it creates no problem. Any untreated craft paper is suitable for this purpose.

FIGS. 1, 5 and 6 of the drawings exemplify one embodiment of the invention, that is, a tray T which holds the wood flour above the charcoal bed of a charcoal broiler B. The tray T is a simple, flat, metal sheet 20 having hangers 21 at opposite edges of the sheet. The tray may be of any suitable size, for example, the sheet 20 may be approximately 3 inches wide and 6 inches long. Moreover, it is not essential that this tray be rectangular as illustrated. It can be circular, oval or in any other selected form.

This sheet 20 must be made of metal or like material capable of resisting the heat encountered in a broiler. The surface of the sheet can be continuous or it may be reticulated with small openings arranged in any suitable pattern. The sheet 20 may also have upturned rims at one or more of its edges to form, in effect, a shallow pan. The hangers 21 are simple straps which upstand from opposing edges of the sheet 20, with hooks 22 at their tops to engage rods 23 of the gridiron above the charcoal broiler, as in the manner shown at FIGS. 4 and 5. These hangers 21 can be fashioned in designs other than that illustrated, the primary function of the hangers being to hold the tray sheet several inches below the gridiron. Likewise, where a spit or other means for holding meat is used with the broiler, where no gridiron is needed, the tray may be provided with legs or lateral arms in any desired arrangement, not shown, to support the tray at a proper distance below the meat being cooked, yet above the charcoal flame.

When the tray is used, it is placed underneath the gridiron of the broiler and then a bed of wood flour W is placed upon the sheet 20. This bed may be from ⅛-inch to ½-inch thick, and at a thickness sufficient to permit the wood flour to slowly smolder to release smoke and vapor. The rate of burning of the flour upon this tray will vary considerably depending upon the thickness of the bed of flour, the height of the tray above the charcoal embers, the heat of the burning embers, and the insulation provided by the sheet 20. It may also be controlled to some extent by wetting the wood flour. Simple trials will establish the desirable parameters for such variables. For example, the insulation provided by the sheet 20 is usually not very important and sheets having an open, reticulated pattern have proven to be suitable in ordinary charcoal broiling operations. With a reticulated tray, however, a layer of paper between the tray and the bed of wood flour will be necessary to prevent the wood flour from sifting through the tray.

Where a shallow broiler is used and it is necessary to place the tray close to charcoal embers or to flames where the heat of the fire can be intense, the tray may become too hot. Then the tray is preferably a solid sheet, and a baffle sheet, not shown, may be placed upon the tray.

FIG. 7 shows an alternate embodiment of the invention where the wood flour is placed upon the floor 25 of the charcoal broiler B. A small area 25' of this floor is cleared of charcoal to receive the wood flour and, if necessary, this area 25' may be fenced off by a simple wall 26 which sets upon the floor of the tray as shown in broken lines. When this arrangement is used, a bed of the wood flour is placed upon the cleared space 25' of the floor 25. The protective wall 26, if used, will confine the wood flour and protect it from the heat of the burning charcoal if such is necessary. The burning of the wood flour is the same as heretofore described.

Several types of wood flour may be used in the present invention, hickory being preferred. This wood flour is fine enough to permit these wood particles to compact together with small intersticies between them. The key to successful burning of wood flour, in contrast to sawdust and larger particles of wood, lies in the fineness of the grind. It was discovered that the wood flour should be ground at least to a fineness which will pass a 40 mesh screen, and preferably, an 80 mesh screen. A hickory wood flour ground to a fineness such that:

96 percent passes a 40 mesh screen
66 percent passes a 80 mesh screen
51 percent passes a 100 mesh screen was found to be very satisfactory when burnt in a charcoal broiler, either in a tray or upon the floor of the charcoal broiler.

If a tray is used, the wood flour may be applied to the tray before the tray is fitted to the underside of the gridiron. Preferably, however, the tray T is fitted upon the gridiron 23 and then a bed of wood flour is applied to the tray after the charcoal in the broiler is burning and the broiler is ready for cooking. This may be done by pouring a layer of loose wood flour upon the tray T. The cook or fireman can quickly determine an amount of wood flour for the subsequent cooking operation.

Another and the preferable mode of applying wood flour, either upon a tray or upon the floor of a burner, is to provide the same with wood flour being within a flat, paper envelope or packet 30 containing a suitable charge of the wood flour W as shown at FIGS. 2 and 3. This packet 30 will be slightly smaller than the tray T. When the packet is placed upon the tray or upon the floor of a charcoal burner, the upper surface of the paper envelope will burn away leaving the wood flour exposed for burning by smoldering. The flame of the burning packet will usually be just enough to ignite the wood flour as it is exposed. A packet is especially desirable where a reticulated tray T or other similar support is used, since the underside of the envelope will not burn away and will prevent the wood flour from shifting through openings in the tray.

Another mode of providing a wood flour is to form the same as a porous cake 31, which is slightly smaller than the tray T, as shown at FIG. 4. Such a cake has the wood flour particles cemented together in a somewhat loose manner so that the cake will be porous to permit smoke and vapor to emanate from the cake 31. A solution of ordinary flour paste or a paste of any material which will burn without undesirable fumes can be used for this purpose providing the cake is not tightly compacted when formed. The cake may be placed upon a tray T or the floor of a charcoal burner when it is ready for use.

Another mode of using finely milled wood flour in barbecuing meat resides in rolling a piece of meat in the wood flour the same as is commonly done with wheat flour. Because the wood flour, as described, is so finely milled, a layer of it will adhere to the meat the same as does wheat flour. When the meat is then cooked, it may be cooked in a comparatively hot flame, so hot that the layer or bed of wood flour upon the meat will actually char and smolder and even burn like punk, but in this instance, the smoke and vapors from the smoldering wood flour will be imparted directly into the meat flavoring the same in a comparatively intense manner. When the meat is cooked, the inedible crust formed by the wood flour may be easily removed from the meat.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

What is claimed is:

1. A method for generating wood smoke in a broiler wherein fuel is ignited to flame and burn and meat is placed for cooking, to impart smoke flavor to meat cooked therein, including the steps of:
    (a) placing the meat within the broiler to provide surfaces of the meat which are separated from the flames of the burning fuel;
    (b) placing upon such surfaces a bed of wood flour which is ground and milled to a fineness of at least 40 mesh; and
    (c) igniting the wood flour bed to permit the same to smolder and emit smoke to permeate the meat as it is being cooked.

* * * * *